US008229093B2

(12) United States Patent
Martin

(10) Patent No.: US 8,229,093 B2
(45) Date of Patent: Jul. 24, 2012

(54) METHOD FOR MARKETING TO AUDIENCE MEMBERS BASED UPON VOTES CAST BY AUDIENCE MEMBERS

(76) Inventor: David A. Martin, Bentleyville, OH (US)

( * ) Notice: Subject to any disclaimer, the term of this patent is extended or adjusted under 35 U.S.C. 154(b) by 1484 days.

(21) Appl. No.: 11/671,811

(22) Filed: Feb. 6, 2007

(65) Prior Publication Data

US 2007/0112648 A1    May 17, 2007

Related U.S. Application Data

(60) Provisional application No. 60/823,546, filed on Aug. 25, 2006.

(51) Int. Cl.
*H04M 11/00* (2006.01)
(52) U.S. Cl. ............... 379/92.02; 379/90.01; 379/93.12
(58) Field of Classification Search ............... 379/92.02, 379/90.01, 93.12, 93.05, 93.06, 93.07, 93.24; 705/7.24, 7.32, 7.33, 7.34
See application file for complete search history.

(56) References Cited

U.S. PATENT DOCUMENTS

| | | | |
|---|---|---|---|
| 4,375,032 A | 2/1983 | Uchida | |
| 5,244,235 A | 9/1993 | Helgeson | |
| 5,367,148 A | 11/1994 | Storch et al. | |
| 5,432,506 A | 7/1995 | Chapman | |
| 5,456,498 A | 10/1995 | Greene | |
| 5,508,731 A | 4/1996 | Kohorn | |
| 5,594,226 A | 1/1997 | Steger | |
| 5,608,785 A | 3/1997 | Kasday | |
| 5,737,886 A | 4/1998 | Kruckemeyer | |
| 5,819,236 A | 10/1998 | Josephson | |
| 5,832,464 A | 11/1998 | Houvener et al. | |
| 5,903,881 A | 5/1999 | Schrader et al. | |
| 5,913,204 A | 6/1999 | Kelly | |
| 5,915,243 A | 6/1999 | Smolen | |
| 5,948,061 A | 9/1999 | Merriman et al. | |
| 6,030,001 A | 2/2000 | Kruckemeyer | |
| 6,073,121 A | 6/2000 | Ramzy | |
| 6,134,532 A | 10/2000 | Lazarus et al. | |
| 6,181,184 B1 | 1/2001 | Yamazaki et al. | |
| 6,181,814 B1 | 1/2001 | Carney | |
| 6,195,452 B1 | 2/2001 | Royer | |
| 6,317,722 B1 | 11/2001 | Jacobi et al. | |
| 6,334,110 B1 | 12/2001 | Walter et al. | |
| 6,390,362 B1 | 5/2002 | Martin | |
| 6,443,840 B2 | 9/2002 | Von Kohorn | |
| 6,578,008 B1 | 6/2003 | Chacker | |
| 6,760,595 B2 | 7/2004 | Inselberg | |
| 6,768,895 B2 | 7/2004 | Lahtinen | |
| 6,853,982 B2 | 2/2005 | Smith et al. | |
| 6,970,915 B1 | 11/2005 | Partovi et al. | |
| 6,993,496 B2 | 1/2006 | Pittelli | |
| 7,043,531 B1 | 5/2006 | Seibel et al. | |
| 7,062,457 B1 | 6/2006 | Kaufman | |
| 7,072,846 B1 | 7/2006 | Robinson | |
| 2001/0005670 A1 | 6/2001 | Lahtinen | |
| 2002/0080934 A1* | 6/2002 | Katz ........................ 379/93.02 |
| 2002/0107724 A1 | 8/2002 | Openshaw, II et al. | |
| 2002/0123924 A1* | 9/2002 | Cruz ............................... 705/10 |
| 2003/0048883 A1* | 3/2003 | Warren et al. .............. 379/88.17 |
| 2003/0142800 A1 | 7/2003 | Paschal et al. | |
| 2003/0172004 A1 | 9/2003 | Anderson | |
| 2005/0161507 A1 | 7/2005 | Openshaw, II et al. | |
| 2005/0272495 A1 | 12/2005 | Penner et al. | |
| 2005/0289622 A1 | 12/2005 | Vanderberghe et al. | |
| 2006/0058103 A1* | 3/2006 | Danieli et al. ................. 463/42 |
| 2006/0095265 A1* | 5/2006 | Chu et al. ...................... 704/268 |
| 2006/0173701 A1 | 8/2006 | Gurvey | |
| 2007/0156507 A1* | 7/2007 | Connelly et al. ................ 705/10 |
| 2008/0045284 A1* | 2/2008 | Assaad et al. .................... 463/9 |

* cited by examiner

*Primary Examiner* — Melur Ramakrishnaiah

(74) *Attorney, Agent, or Firm* — Roger D. Emerson; Daniel A. Thomson; Emerson Thomson Bennett, LLC

(57) ABSTRACT

A new and improved method for marketing to customers based upon incoming telephone calls is herein disclosed. A marketing method for use with a broadcast featuring multiple performers for whom at least one audience member may vote, the vote being based upon a performer's performance, the vote being communicated by an electronic device includes receiving the vote from at least one audience member, the vote being cast for at least one of the performers, capturing contact information for the audience member who cast the vote, identifying the contact information with the performer, and communicating a marketing offer to the audience member, the marketing offer related to the performer.

16 Claims, No Drawings

METHOD FOR MARKETING TO AUDIENCE MEMBERS BASED UPON VOTES CAST BY AUDIENCE MEMBERS

This application claims priority to a provisional patent application, Ser. No. 60/823,546, filed Aug. 25, 2006, entitled METHOD FOR MARKETING TO CUSTOMERS BASED UPON INCOMING TELEPHONE CALLS. This invention relates to the field of marketing, and more particularly to marketing to particular consumers based upon their preferences, and even more particularly to marketing to particular consumers based upon preference voting.

I. BACKGROUND OF THE INVENTION

A. Field of the Invention

B. Description of the Related Art

Many companies deal with marketing, and many companies use different mechanisms to try to ascertain the preferences of consumers so that they can more accurately market to the consumer.

Current television shows have increasingly begun to engage audiences through telephone and online call-in participation. For example, the American Idols® television show involves audience participation through telephone call-in, and online voting, for participats/contestants on the show.

With respect to the American Idol® television show, each contestant will be assigned their own toll-free number and text message short number during the performance show. To vote, an audience member will watch American Idol each week and dial the phone number of the contestant for whom they wish to vote. Or, cell phone users may text the word VOTE to the Text Messaging 4 digit short numbers promoted for each contestant. Voting will open at the end of each performance show.

During one season, there were two performance shows a week for audience members to vote on—Tuesday night featured the females and Wednesday night featured the males. After the Tuesday night show, audience members could vote for any of the females who performed. After the males performed on Wednesday night, the lines were open and the audience members had a chance to vote for any male contestant that performed that night. Audience members had at least two hours after the show to cast their vote before lines close. At the end of those first three weeks of voting, American Idol® had a Top 12, consisting of 6 males and 6 females and voting would then only take place at the end of every Tuesday night performance show.

Voting for American Idol® opens at the end of the performance show each week and stays open for at least 2 hours, subject to time zone restrictions. Outside of these times, the toll-free lines will play a busy signal and the call will not count as a vote. If a cell phone call or text message is placed outside of the vote window, the vote will also not count.

As part of the process to ensure that the American Idol® voting system is accurate and ready for the public to call and vote, a test window is built into the toll-free system.

During this test window, anyone calling the toll-free numbers from a phone with a West Coast area code will hear the 'thanks for voting . . . ' message. This vote window is for testing purposes only and any calls received during this time do not count as valid votes.

If an audience member is calling or text messaging from a cell phone and they are in a different time zone from their cell phone number, the systems will accept or reject the vote based on the time zone of the cell phone area code. For example, if the caller has a New York cell phone area code but is calling from Los Angeles, they will be voting outside the East Coast voting window and the vote will not be accepted.

At the end of the performance show each week, voting can begin and phone lines will be opened. Voting lasts for at least 2 hours, subject to local time zone restrictions, from the end of the show and during that time the audience member will hear a pre-recorded message thanking them for voting for their chosen contestant. Each contestant will have their own number read/shown on air, and the phone message will confirm for whom the audience member has voted. After the voting window, no more votes will be accepted and lines will play out a busy signal.

Audience members can vote by text message using their wireless phone keypad to write the message VOTE and sending it to a contestant number. This 4 digit contestant number, such as 5701, relates directly to the contestant of choice and will be displayed on the show.

Text message voting will open at the end of each performance show and stay open for at least 2 hours, subject to local time zone limitations. Voting will not be open during the show or outside the foregoing two hour time period determined by the area code on the wireless phone. Votes sent outside of the voting window will be invalid The present invention provides a new and improved method for direct marketing to consumers based upon votes the consumer casts, and overcomes certain difficulties inlierent in the related inventions while providing better overall results.

II. DEFINITIONS

Audience Member—an individual from a reading, viewing, or listening public, wherein "individual" can include a household or other group of people.

Broadcast—sound, images, or other data, transmitted by an electronic signal.

Contact Information—any of the following: telephone number (including cellular telephone number), facsimile number, telefax number, e-mail address, IP address, mailing address, or post office address.

Consumer—one that utilizes economic goods and/or services.

Genre—a category of artistic, musical, or literary composition characterized by a particular style, form, or content.

Marketing Offer—malting available to a consumer, a product or service.

Performer—an individual, or entity, giving a public presentation or exhibition. The term performer is intended to include inanimate objects, as well as fictional characters.

Text Messaging—sometimes known as SMS (short messaging service)—is a way of communicating short messages via a wireless/cellular telephone.

Vote—an expression of opinion or will in response to a proposed decision, especially one given as an indication of approval or disapproval of a performer, proposal, motion, or candidate.

III. DESCRIPTION OF THE RELATED ART

U.S. Pat. No. 7,072,846 describes an invention using clusters, which include taste signatures, which represent the tastes of a cluster. Users are enabled to find clusters that match their tastes, and artists are enabled to find the clusters where the users are who are likely be interested in their work. Clusters thus serve as hubs of activity for particular tastes; in most embodiments ratings of items of interest to those tastes can be viewed, and various embodiments may include various means for inter-user communication so that communities of people with similar tastes are formed.

U.S. Pat. No. 6,853,982 describes various methods for monitoring user browsing activities, and for using such information to provide session-specific item recommendations to users. In one embodiment, a monitoring component of a merchant's Web site maintains a record of products viewed by each user during a current browsing session—preferably based on visits to product detail pages. A recommendations component uses the resulting history of viewed products to identify additional products to recommend, preferably using a pre-existing table that maps products to related products. In one embodiment, this table is generated by periodically analyzing user browsing histories to identify correlations between purchases, viewing events, and/or other actions performed with respect to particular products. The recommended items may be displayed together with an option to individually deselect the recently viewed items on which the recommendations are based. Embodiments are also disclosed that use recent browse node visits, and recent searches, to generate the recommendations.

U.S. Pat. No. 6,760,595 describes a method for providing interactive audience participation at live spectator events enhances enjoyment for a plurality of spectators. Participating spectators employ wireless interactive devices that present a promotional message and include user input and output interfaces. Spectators are queried, and enter answers via the user input interface. The answers are transmitted to a central processor, stored as spectator data, and processed into results. A visual display or the user output interface announces the results to the spectators.

U.S. Pat. No. 6,443,840 describes a system and method for evaluating responses to broadcast programs, such as television programs, including an instructional signal modulated onto a signal transmitted concurrently with the television program, simulcast, or time-multiplexed with a television. At each of a plurality of remote receiving stations, one or more members of a remote audience has the opportunity to respond to a situation presented in the television program by entering a response on a keyboard. The system includes response evaluation circuitry which may be located at a central facility or partially at the central facility and partially at each remote receiving station, or completely within a response unit at each remote receiving station, in the latter case the response unit having a memory responsive to the instructional signal for storing acceptable responses, a comparison circuit for comparing responses entered at the keyboard with those stored in the memory, circuitry for scoring responses in accordance with commands from the instructional signal, and a recording device for providing a permanent record of the audience score at the remote station. For conducting a sweepstakes, numbers or other responses are entered at the remote stations and are stored at a central facility for verification. The program may be presented live conducted by a host at a central station, or by a prerecorded message accessible by telephone from a remote station with regulation from a central station, and members of the remote audience may predict or select winning contestants.

U.S. Pat. No. 6,334,110 describes a system and method for analyzing customer behavior based on the time when those behaviors occur. This invention captures information about customer transactions and interactions over time, classifies customers into one or more clusters based on their time-based interactions and transactions, or both, and uses this classification to perform selected target marketing and cross-selling. This is performed by temporally tagging customer transactions and interactions, analyzing the tagged information to create temporal profiles, creating advertising campaigns aimed at the temporal profiles, triggering an advertising campaign, and analyzing the effectiveness of the advertising campaign.

U.S. Pat. No. 6,317,722 describes a computer-implemented service that recommends products or other items to a user based on a set of items known to be of interest to the user, such as a set of items currently in the user's electronic shopping cart. In one embodiment, the service identifies items that are currently in the user's shopping cart, and uses these items to generate a list of additional items that are predicted to be of interest to the user, wherein an additional item is selected to include in the list based in-part upon whether that item is related to more than one of the items in the user's shopping cart. The item relationships are preferably determined by an off-line process that analyzes user purchase histories to identify correlations between item purchases. The additional items are preferably displayed to the user when the user views the contents of the shopping cart.

U.S. Pat. No. 5,948,061 describes methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisement based upon profiling of users and networks.

U.S. Pat. No. 5,915,243 describes a method and apparatus for offering promotions to a consumer on the basis of a dynamic information profile for that consumer. The dynamic information profile is formed by creating an initial information profile for the consumer, selecting questions for the consumer based on the information profile, presenting the questions to the consumer, collecting the responses to the questions, and updating the information profile using the responses to the questions. Promotions can be offered to a consumer based upon the entire information profile or a portion of the information profile.

U.S. Pat. No. 5,608,785 describes a telephone network modified so that callers making telephone calls can engage in a game of chance to win a prize without having had to specially dial the game processor, i.e., the telephone numbers of the telephone calls are independent of the game processor. In one embodiment of the invention, the game processor is part of the switch that processes calls through a telecommunications network. Upon conclusion of the game, the caller is supplied with an indication as to whether or not he is a winner and will receive a prize. The determination that a caller is a winner need be made only if the call was successfully completed, that is, routed to a destination at which the call is answered. Advantageously, a) games of chance are attractive to people, especially when it costs nothing to enter, b) the determination that a caller is a winner can be immediately conveyed to him, and c) by proper selection of the odds of winning and the value of prizes, the game can be arranged so that its cost to a telecommunications carder is less than that carrier's present discounting program.

U.S. Pat. No. 5,508,731 describes a system and method for wagering and for evaluating responses to broadcast programs, such as television programs, which includes an instructional signal modulated onto a signal transmitted concurrently with the television program, or time-multiplexed with a television. At each of a plurality of remote receiving stations, one or more members of a remote audience has the opportunity to respond to a situation presented in the television program by entering a response on a keyboard. The system includes, at each remote receiving station, a response unit having a memory responsive to the instructional signal for storing acceptable responses, a comparison circuit for comparing responses entered at the keyboard with those stored in the memory, circuitry for scoring responses in accordance with commands from the instructional signal, and a recording device for providing a permanent record of the audience score at the remote station. For conducting a sweepstakes, numbers or other responses are entered at the remote stations and are stored at a central facility for verification. Evaluation of a response may be performed at a central location or by a player's response unit. The program may be presented live conducted by a host at a central station, or by a prerecorded message accessible by telephone from a remote station with regulation from a central station, and may be transmitted via satellite simultaneously to numerous central stations for rebroadcast to an enlarged participatory audience.

U.S. Patent Appln. No. 2002/0123924 describes indications of consumer demand for local presentation of entertainment performances in geographic areas are gathered via the Internet. Contact information, consumer preferences, and demographic information may also be collected from consumers. The information may be stored in a database or databases. The demand information is made available to individuals and companies which produce, promote, distribute, sell and host shows as well as the performers and their representatives. Demographic lifestyle, and voter preference information, coupled with voter entertainment demand, geographic location, and contact information, may be used by the database owner, on behalf of third parties, to provide promotional and advertising messages to voters, to provide product and service offers to voters, and to conduct custom research studies. Demographic, lifestyle, and voter preference information, coupled with voter entertainment demand, and geographic location is provided, in aggregate, to consumer products, consumer services, and advertising companies as a tool to assist in formulating advertising and marketing strategies.

IV. SUMMARY OF THE INVENTION

In accordance with one aspect of the present invention, a telemarketing method for use with an associated television broadcast featuring associated multiple performers for whom at least one audience member may vote, wherein the performers are competing to advance to a final round, the vote being based upon performances by the performers, the vote being communicated by an associated telephone includes receiving the vote from the at least one audience member, the vote being communicated for one of the associated performers, capturing a telephone number for the at least one audience member who communicated the vote, associating the telephone number with the performer for whom the audience member voted, and offering for sale to the audience member, merchandise associated with the performer for whom the audience member voted.

In accordance with another aspect of the present invention, a marketing method for use with an associated broadcast featuring associated multiple performers for whom at least one audience member may vote, the vote being based upon a performer's performance, the vote being communicated by an associated electronic device includes receiving the vote from the at least one audience member, the vote being communicated for at least one of the associated performers, capturing contact information for the at least one audience member who communicated the vote, identifying the contact information with the at least one associated performer, and communicating a marketing offer to the at least one audience member, the marketing offer related to the at least one associated performer.

In accordance with another aspect of the present invention, the associated electronic device is chosen from the group comprising: telephone, cellular telephone, computer, and personal digital assistant.

In accordance with another aspect of the present invention, the contact information is chosen from the group comprising: physical address, post office box, telephone number, and e-mail address.

In accordance with another aspect of the present invention, the at least one audience member is not in the same physical location as the associated performers.

In accordance with another aspect of the present invention, communicating a marketing offer to the at least one audience member, the marketing offer related to the at least one associated performer includes contacting the at least one audience member by telephone and offering for sale, at least one item containing the likeness, name, voice recording, or image of the at least one associated performer for whom the at least one audience member voted.

In accordance with another aspect of the present invention, receiving the vote from the at least one audience member, the vote being communicated for at least one of the associated performers includes providing a phone number for the at least one audience member to call to communicate a vote, associating a different number with each of the associated multiple performers, and when the at least one audience member enters the number for the performer, associating an electronic signal, from a telephone used by the at least one audience member, with a vote for the performer.

In accordance with another aspect of the present invention, receiving the vote from the at least one audience member, the vote being communicated for at least one of the associated performers includes providing an electronic server for receiving e-mail, providing an interactive website, providing voting via e-mail for at least one of the associated performers, and receiving the e-mail vote from the at least one audience member, the vote being communicated for at least one of the associated performers.

In accordance with another aspect of the present invention, the method comprises at least two rounds of voting.

In accordance with another aspect of the present invention, the method further includes determining categories of marketing offers in which there is a correlation between the categories and the associated performer and communicating at least one marketing offer to the audience member, wherein the marketing offer is chosen from at least one of the categories.

In accordance with another aspect of the present invention, the audience member has communicated at least two votes, wherein the method further includes determining a number of times the audience member has voted for the associated performer, providing a first marketing offer related to the at least one associated performer, and providing at least a second marketing offer related to the at least one associated performer, wherein the first marketing offer and the at least a second marketing offer are different depending on the number of times the audience member voted for the associated performer.

In accordance with another aspect of the present invention, the method further includes categorizing the performers by genre, analyzing votes communicated by the audience member to determine if the votes are all or at least substantially all for a particular genre, and communicating a marketing offer to the audience member based upon the genre.

In accordance with another aspect of the present invention, the method further includes providing a sweepstakes, after a winner is chosen from among the associated performers, entering the audience member in the sweepstakes with each vote communicated for the winner, and selecting a winner of the sweepstakes from all available entries.

In accordance with another aspect of the present invention, the performer's performance is a song and the broadcast is a television broadcast.

In accordance with another aspect of the present invention, the at least one audience member votes for the performer the audience member wants to advance to the next round.

In accordance with another aspect of the present invention, the communicating a marketing offer to the at least one audience member, the marketing offer related to the at least one associated performer includes communicating a marketing offer to the at least one audience member, the marketing offer related to the at least one associated performer, wherein the marketing offer contains a voice message from the at least one associated performer.

In accordance with another aspect of the present invention, the audience member communicates at least four votes, the method further includes providing the first marketing offer if the audience member voted for the performer once, providing the second marketing offer if the audience member voted for the performer twice, and providing a third marketing offer if the audience member voted for the performer more than twice.

In accordance with another aspect of the present invention, a marketing method for use with an associated broadcast featuring associated multiple performers for whom at least one audience member may vote, the vote being based upon a performer's performance, the vote being communicated by an associated electronic device, the method includes receiving votes from multiple audience members, the votes being communicated for at least one of the associated performers, capturing contact information for the audience members who communicated the votes, identifying the contact information with the at least one associated performer for whom each audience member voted, and compiling a database of contact information and votes communicated in order to develop fan clubs for the associated performer.

In accordance with another aspect of the present invention, the method further includes obtaining permission from the audience member to capture the contact information and to solicit the audience member with offers related to the performer(s). In accordance with another aspect of the present invention, a marketing method for use with an associated broadcast featuring associated multiple performers for whom at least one audience member may vote, the vote being based upon a performer's performance, the vote being communicated by an associated electronic device includes receiving the vote from the at least one audience member, the vote being communicated for at least one of the associated performers, communicating a marketing offer to the at least one audience member at the time of the vote being communicated, the marketing offer related to the at least one associated performer, and providing means for the at least one audience member to substantially immediately respond to the marketing offer.

Still other benefits and advantages of the invention will become apparent to those skilled in the art upon a reading and understanding of the following detailed specification.

V. DESCRIPTION OF THE INVENTION

The present invention involves capturing the following data: the telephone number(s) of the voter(s) from a caller identification device, and the content of the vote (i.e. who or what they voted for). The process used for capturing data is well known in the art, and for the sake of brevity, will not be further defined herein. The data captured would then be used to market and sell products (such as American Idol® CDs, etc.) related to the specific content/performer voted for. For example, those audience members who voted for Carrie Underwood would have Carrie Underwood CDs marketed to them. In one embodiment of the invention, the marketing would occur for a specific, pre-set period of time, although this is not a requirement of the invention. Telephone solicitation for sales of products to voters could utilize recorded messages from the performer, person, product, mascot, etc. for whom the voter voted for. For example, a recording of Carrie Underwood promoting her CD could be played to those who voted for her, via computerized telephone solicitation.

By way of example of the above embodiment, an audience member uses the telephone call-in number to vote for Carrie Underwood after a particular episode of American Idol®. A pre-recorded message is played for the audience member prior to the vote that states that casting a vote comprises the audience member's agreement to allow the television show, or a third party, to market certain products and/or services to the audience member, and allows the collection and storage of contact information for the audience member. The audience member's telephone number is retrieved and placed in a database, wherein the telephone number is associated with Carrie Underwood based on the audience member's vote. For the next three weeks, a telephone call will be periodically placed to the audience member, offering products, using or incorporating, Carrie Underwood's image, likeness, and/or voice. During the telephone call, a pre-recorded message from Carrie Underwood is played for the audience member, asking the audience member if they would like to purchase her new CD. The message could also include any other available products, or an offer to join Carrie's fan club. An automated response system could be used to allow the audience member to make a selection/purchase based on the available options.

In another embodiment of the invention, reverse look up could be used to find audience member addresses, including physical and e-mail addresses, using their telephone numbers. Once the addresses are obtained, certain products and/or services would be marketed to the voter via regular mail or e-mail. As in the example above, the products and/or services would be associated with the performer for whom the audience member voted. A catalog of products related to the performer could be mailed to the audience member. The process of reverse look up is well known in the art, and, for the sake of brevity, will not be further described herein.

In another embodiment of the invention, the television show, online web cast, etc. could state that all votes called in or submitted online constitute a "business relationship" with the caller, permitting call-back by the show/performer(s) to inform the voter of products and/or services. This would aid the entity doing the marketing in avoiding potential legal difficulties with respect to mail, e-mail, and telephone solicitations. It is to be understood that this invention also incorporates an active permission being obtained from the audience member. For example, in order to continue with the vote, the audience member would have to indicate agreement to receive marketing offers and/or marketing material.

In another embodiment of the invention, the marketing effort is tied to a particular genre. In this embodiment, information is collected for audience members based upon multiple votes by the audience member. The available performers that can be voted for are categorized into particular genres.

The categorization may be done manually or via a sorting database or program. Particular marketing offers are then associated with each genre. The audience member's votes are compared with the available genres. If it is determined that the audience member's votes fall within a particular genre, the audience member will receive marketing offers and/or marketing material related to that particular genre. The particular method used for developing the genres and/or determining whether an audience member's votes sufficiently fall within that genre are not intended to be limitations of this invention. Any method may be chosen, as long as chosen using sound business and marketing judgment. It is also within the scope of this invention to send the audience member marketing offers and/or marketing materials from more than one genre, as it is contemplated by this invention that an audience member's votes and/or a particular performer may be in more than one genre.

By way of example of the above embodiment, an audience member casts ten votes over a period of time. Nine of the ten votes were cast for performers that fall into the hard rock genre. With the collected contact information, the audience member is sent marketing offers and/or marketing materials related to hard rock. Some examples of the types of offers and/or marketing material include, but are not limited to, the following: audiocassettes, CDs, movies, clothing, posters, toys, concert tickets, books, and magazine subscriptions. In this embodiment, an audience member's votes are considered within a genre if more than half of the votes are cast in that particular genre.

In another embodiment of the present invention, a database is created of the number of times each audience member has voted for a particular performer. It is possible that as a particular contest or broadcast progresses, that an audience member may vote for a particular performer more than once, if the performer continues to advance. A different marketing approach could be taken toward audience members who have voted for a particular performer on multiple occasions. For example, if an audience member voted for a particular performer four times, a limited or special edition of an item could be offered to that audience member.

In another embodiment of the present invention, a list of contact information for various audience members could be compiled for use in developing a fan club for a particular performer. The contact information could also be maintained indefinitely so as the particular performer creates additional material (i.e. a new CD, book, etc.) the audience member could be contacted.

In another embodiment of the present invention, the audience member is entered into a sweepstakes each time they vote. In one embodiment, after the call-in session is over, the name of an audience member is randomly selected from the available entries, and the winner receives a prize. In one embodiment, the prize could be associated with the performer for whom the winner voted. In another embodiment, the sweepstakes winner is limited to audience members who voted for the eventual winner or those who advanced to the next round. In another embodiment, the audience members who voted for the eventual winner, or those performers that advanced to the next round, receive more entries than audience members who voted for other performers. It is to be understood that the sweepstakes drawing could be held at any time chosen using sound business and marketing judgment.

In another embodiment of the present invention, the marketing offer is provided to the audience member at the time of their vote. For example, if an audience member calls in to vote for Carrie Underwood, a recording will ask the audience member if they would like to place an order for Carrie Underwood's new CD. Any other type of marketing offer could be presented at this time as well. The audience member could then respond with a "yes," "no," or "not at this time" response. The response could be verbal, using voice recognition technology, or keys on a phone could be depressed to correspond to the responses, or options for responding could be provided on an online page.

It is to be understood that this invention is intended to include any type of situation where an audience member may vote on a performer. The performances are not limited to humans or even animate objects. It is also understood that this invention can be done automatically or with human intervention.

It is to be understood that this invention incorporates any type of situation where an individual or entity submits a vote (or other mode of showing preference) for another individual or entity involved in some form of contest. Also, the invention is intended to incorporate any marketing use of information gathered from these votes.

The invention has been described with reference to several embodiments.

Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A marketing method for use with an associated broadcast featuring associated multiple performers for whom at least one audience member may vote, the vote being based upon a performer's performance, the vote being communicated by an associated electronic device, the method comprising the steps of:
   receiving at least two votes from the at least one audience member, the votes being communicated for at least one of the associated performers;
   capturing contact information for the at least one audience member who communicated the vote, wherein the method comprises at least two rounds of voting;
   identifying the contact information with the at least one associated performer;
   determining a number of times the audience member has voted for the associated performer;
   providing a first marketing offer related to the at least one associated performer; and,
   providing at least a second marketing offer related to the at least one associated performer, wherein the first marketing offer and the at least a second marketing offer are different depending on the number of times the audience member voted for the associated performer.

2. The method of claim 1, wherein the associated electronic device is chosen from the group comprising: telephone, cellular telephone, computer, and personal digital assistant.

3. The method of claim 2, wherein the contact information is chosen from the group comprising: physical address, post office box, telephone number, and e-mail address.

4. The method of claim 3, wherein the at least one audience member is not in the same physical location as the associated performers.

5. The method of claim 4, wherein providing a first marketing offer related to the at least one associated performer comprises the steps of:
   contacting the at least one audience member by telephone; and, offering for sale, at least one item containing the likeness, name, voice recording, or image of the at least one associated performer for whom the at least one audience member voted.

6. The method of claim 2, wherein receiving at least two votes from the at least one audience member, the votes being communicated for at least one of the associated performers comprises the steps of:
provide a phone number for the at least one audience member to call to communicate a vote;
associating a different number with each of the associated multiple performers; and,
when the at least one audience member enters the number for the performer, associating an electronic signal, from a telephone used by the at least one audience member, with a vote for the performer.

7. The method of claim 2, wherein receiving at least two votes from the at least one audience member, the votes being communicated for at least one of the associated performers comprises the steps of:
providing an electronic server for receiving e-mail;
providing an interactive website;
providing voting via e-mail for at least one of the associated performers; and,
receiving the e-mail vote from the at least one audience member, the vote being communicated for at least one of the associated performers.

8. The method of claim 1, wherein the method further comprises the steps of:
determining categories of marketing offers in which there is a correlation between the categories and the associated performer; and,
communicating at least two marketing offers to the audience member, wherein the marketing offer is chosen from at least one of the categories.

9. The method of claim 1, wherein the method further comprises the steps of:
categorizing the performers by genre;
analyzing votes communicated by the audience member to determine if the votes are at least substantially all for a particular genre; and,
communicating a marketing offer to the audience member based upon the genre.

10. The method of claim 1, wherein the method further comprises the steps of:
providing a sweepstakes;
after a winning performer is chosen from among the associated performers, entering the audience member in the sweepstakes with each vote communicated for the winning performer; and,
selecting a winner of the sweepstakes from all available entries.

11. The method of claim 1, wherein the performer's performance is a song and the broadcast is a television broadcast.

12. The method of claim 11, wherein the at least one audience member votes for the performer the audience member wants to advance to the next round.

13. The method of claim 1, wherein providing a first marketing offer related to the at least one associated performer comprises the step of:
providing a first marketing offer related to the at least one associated performer the marketing offer related to the at least one associated performer, wherein the marketing offer contains a voice message from the at least one associated performer.

14. The method of claim 1, wherein the audience member communicates at least four votes, the method further comprising the steps of:
providing the first marketing offer if the audience member voted for the performer once;
providing the second marketing offer if the audience member voted for the performer twice; and,
providing a third marketing offer if the audience member voted for the performer more than twice.

15. The method of claim 1, wherein the method further comprises the step of:
obtaining permission from the audience member to capture the contact information.

16. The method of claim 1, wherein the method further comprises the step of:
informing the audience member that casting their vote constitutes permission to capture the audience member's contact information and to contact the audience member.

* * * * *